United States Patent [19]
Taniguchi et al.

[11] Patent Number: 5,642,294
[45] Date of Patent: Jun. 24, 1997

[54] METHOD AND APPARATUS FOR VIDEO CUT DETECTION

[75] Inventors: Yukinobu Taniguchi; Yoshinobu Tonomura, both of Yokohama, Japan

[73] Assignee: Nippon Telegraph and Telephone Corporation, Tokyo, Japan

[21] Appl. No.: 356,712

[22] Filed: Dec. 15, 1994

[30]     Foreign Application Priority Data

Dec. 17, 1993   [JP]   Japan .................................. 5-317663
[51] Int. Cl.⁶ ...................................... H04N 5/14
[52] U.S. Cl. .................... 364/514 R; 348/700; 348/701
[58] Field of Search .................. 364/514 R; 348/700, 348/701, 699, 415, 403, 405, 409, 416, 452, 595; 382/107; 358/311, 335, 346; 352/38, 87

[56]          References Cited

U.S. PATENT DOCUMENTS 5,083,860   1/1992   Miyatake et al. .
5,500,689   3/1996   Lam ........................ 348/699

FOREIGN PATENT DOCUMENTS 870236526   3/1989   Japan .

OTHER PUBLICATIONS

"Method of Detecting Scene Changes in Moving Pictures", *IBM Technical Disclosure Bulletin*, vol. 34, No. 10A, Mar. 1992.

Primary Examiner—Ellis B. Ramirez
Assistant Examiner—Tony M. Cole
Attorney, Agent, or Firm—Pollock, Vande, Sande & Priddy

[57]              ABSTRACT

A buffer memory buffers a sequence of image data $I_0, I_1, \ldots$ of respective frames while shifting them step by step and discarding the least recent one of them for each step. An inter-image distance calculating means calculates the distance $d(t-i, t-j)$ between respective pieces of image data held in the buffer memory and stores such distance values in a distance table part in a sequential order. A scene changing ratio calculating part calculates the scene changing ratio $C(t-j_c)$ at time t while referring to the distance table part. A decision part compares the scene changing ratio $C(t-j_c)$ with a predetermined threshold value to determine if the image of a preceding frame $j_c$-th from the time t is a cut point.

22 Claims, 12 Drawing Sheets

FIG.2
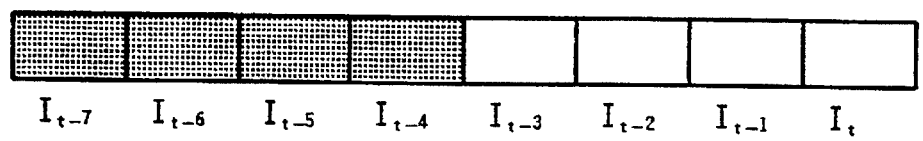
FIG.5
$d(t-i, t-j)$
| i \ j | 0 | 1 | 2 | 3 | 4 | 5 | 6 | 7 |
|---|---|---|---|---|---|---|---|---|
| 0 |   | 0 | 0 | 0 | 1 | 1 | 1 | 1 |
| 1 |   |   | 0 | 0 | 1 | 1 | 1 | 1 |
| 2 |   |   |   | 0 | 1 | 1 | 1 | 1 |
| 3 |   |   |   |   | 1 | 1 | 1 | 1 |
| 4 |   |   |   |   |   | 0 | 0 | 0 |
| 5 |   |   |   |   |   |   | 0 | 0 |
| 6 |   |   |   |   |   |   |   | 0 |
FIG.6
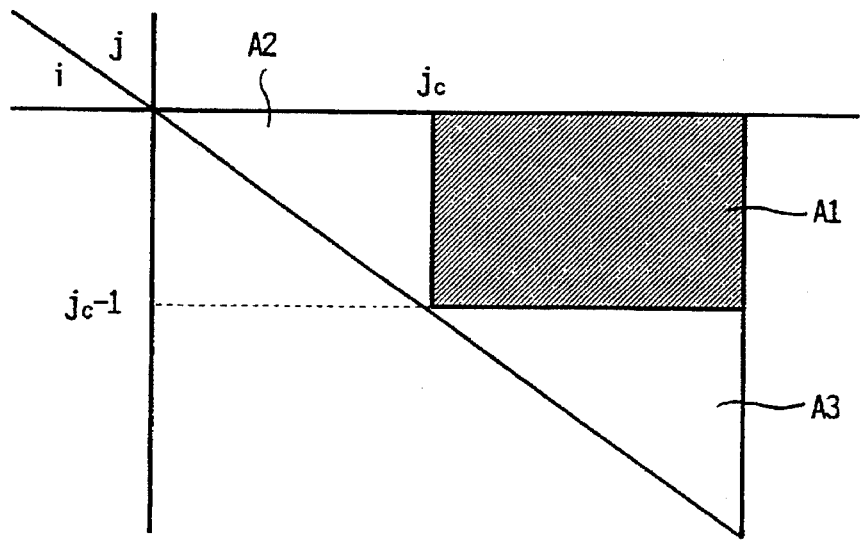

$I_{t-1}$ $I_{t-1-1}$

FIG. 7
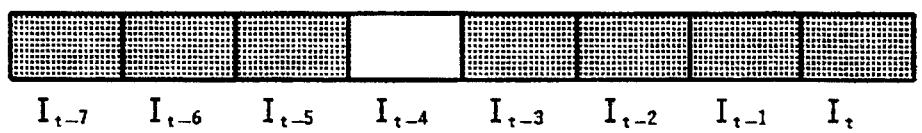
$I_{t-7}$ $I_{t-6}$ $I_{t-5}$ $I_{t-4}$ $I_{t-3}$ $I_{t-2}$ $I_{t-1}$ $I_t$
FIG. 8
$d(t-i, t-j)$
| i \ j | 0 | 1 | 2 | 3 | 4 | 5 | 6 | 7 |
|---|---|---|---|---|---|---|---|---|
| 0 | | 0 | 0 | 0 | 1 | 0 | 0 | 0 |
| 1 | | | 0 | 0 | 1 | 0 | 0 | 0 |
| 2 | | | | 0 | 1 | 0 | 0 | 0 |
| 3 | | | | | 1 | 0 | 0 | 0 |
| 4 | | | | | | 1 | 1 | 1 |
| 5 | | | | | | | 0 | 0 |
| 6 | | | | | | | | 0 |
FIG. 9
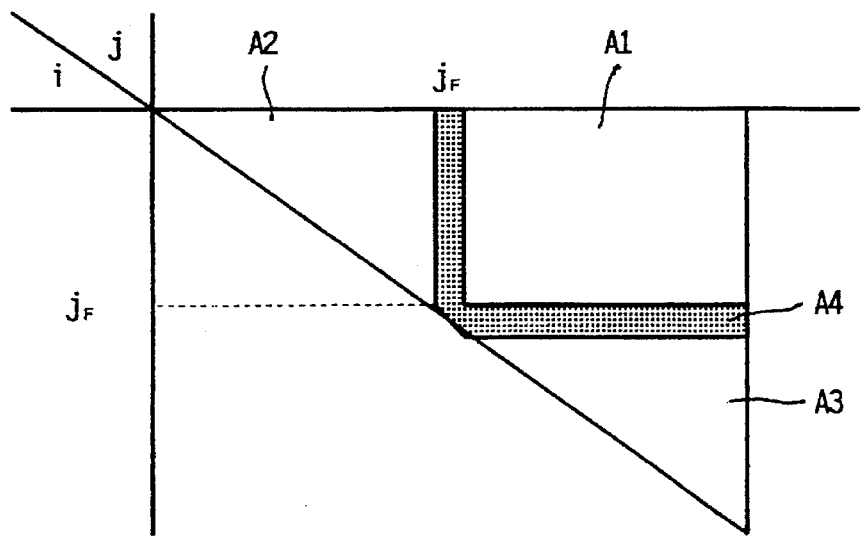

FIG. 10
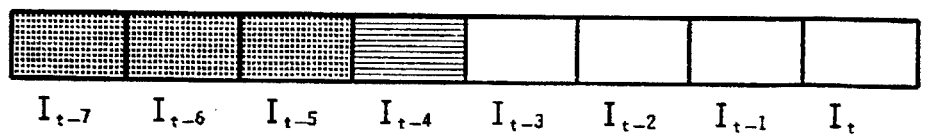
$I_{t-7}$  $I_{t-6}$  $I_{t-5}$  $I_{t-4}$  $I_{t-3}$  $I_{t-2}$  $I_{t-1}$  $I_t$
FIG. 11
$d(t-i, t-j)$
| i \ j | 0 | 1 | 2 | 3 | 4 | 5 | 6 | 7 |
|---|---|---|---|---|---|---|---|---|
| 0 | | 0 | 0 | 0 | 0.5 | 1 | 1 | 1 |
| 1 | | | 0 | 0 | 0.5 | 1 | 1 | 1 |
| 2 | | | | 0 | 0.5 | 1 | 1 | 1 |
| 3 | | | | | 0.5 | 1 | 1 | 1 |
| 4 | | | | | | 0.5 | 0.5 | 0.5 |
| 5 | | | | | | | 0 | 0 |
| 6 | | | | | | | | 0 |
FIG. 12
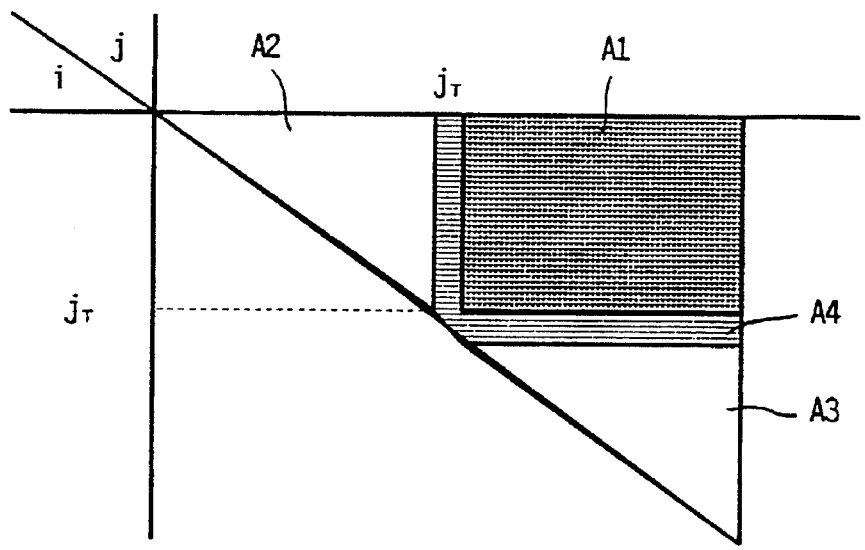

FIG. 13
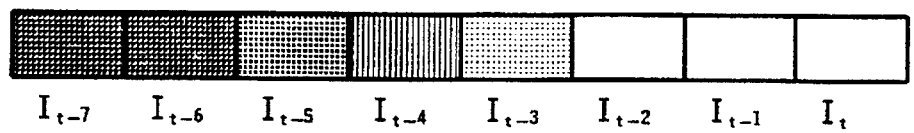
$I_{t-7}$  $I_{t-6}$  $I_{t-5}$  $I_{t-4}$  $I_{t-3}$  $I_{t-2}$  $I_{t-1}$  $I_t$
FIG. 14
$d(t-i, t-j)$
| i \ j | 0 | 1 | 2 | 3 | 4 | 5 | 6 | 7 |
|---|---|---|---|---|---|---|---|---|
| 0 |  | 0 | 0 | 0.2 | 0.4 | 0.7 | 1 | 1 |
| 1 |  |  | 0 | 0.2 | 0.4 | 0.7 | 1 | 1 |
| 2 |  |  |  | 0.2 | 0.4 | 0.7 | 1 | 1 |
| 3 |  |  |  |  | 0.2 | 0.5 | 0.8 | 0.8 |
| 4 |  |  |  |  |  | 0.3 | 0.6 | 0.6 |
| 5 |  |  |  |  |  |  | 0.3 | 0.3 |
| 6 |  |  |  |  |  |  |  | 0 |
FIG. 15
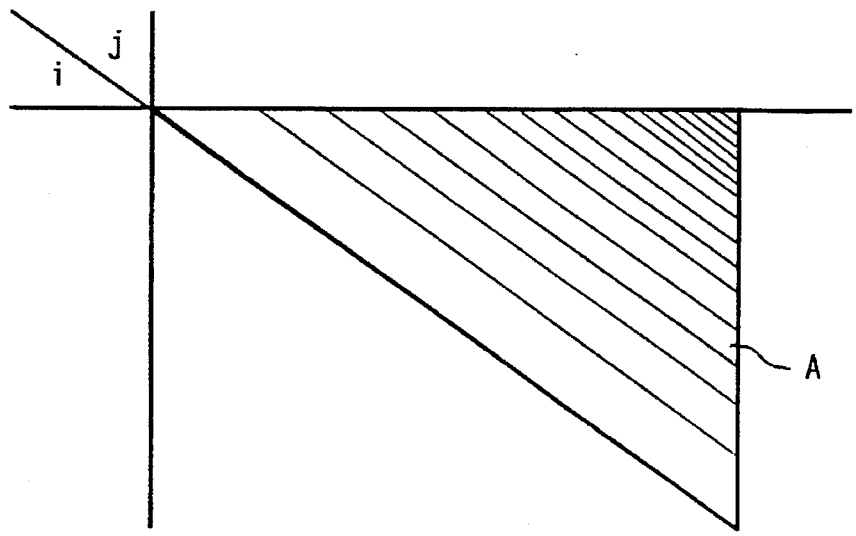

| i \ j | 0 | 1 | 2 | ⋯ | $j_c-2$ | $j_c-1$ | $j_c$ | $j_c+1$ | $j_c+2$ | ⋯ | J |
|---|---|---|---|---|---|---|---|---|---|---|---|
| 0 |  | △ | △ | ⋯ | △ | △ |  |  |  |  |  |
| 1 |  |  | △ | ⋯ | △ | △ | × |  |  |  |  |
| ⋮ |  |  |  |  | ⋮ | ⋮ | ⋮ |  |  |  |  |
| $j_c-2$ |  |  |  |  |  | △ | × | × | × |  |  |
| $j_c-1$ |  |  |  |  |  |  | × | × | × | ⋯ |  |
| $j_c$ |  |  |  |  |  |  |  | △ | △ | ⋯ | △ |
| $j_c+1$ |  |  |  |  |  |  |  |  | △ | ⋯ | △ |
| ⋮ |  |  |  |  |  |  |  |  |  |  | ⋮ |
| J-1 |  |  |  |  |  |  |  |  |  |  |  |

| i \ j | 1 | 2 | 3 | 4 | 5 |
|---|---|---|---|---|---|
| 0 | △ | △ | × |  | A1 |
| 1 |  | △ | × | × |  |
| 2 | A2 |  | × | × | × |
| 3 |  |  |  | △ | △ |
| 4 |  |  | A3 |  | △ |

FIG. 19A $T_{CT}(i,j)$

| i\j | 1 | 2 | 3 | 4 | 5 |
|---|---|---|---|---|---|
| 0 | 0 | 0 | 1 | 1 | 1 |
| 1 |   | 0 | 1 | 1 | 1 |
| 2 |   |   | 1 | 1 | 1 |
| 3 |   |   |   | 0 | 0 |
| 4 |   |   |   |   | 0 |

FIG. 19B $T_{FD}(i,j)$

| i\j | 1 | 2 | 3 | 4 | 5 |
|---|---|---|---|---|---|
| 0 | 0.2 | 0.4 | 0.6 | 0.8 | 1.0 |
| 1 |   | 0.2 | 0.4 | 0.6 | 0.8 |
| 2 |   |   | 0.2 | 0.4 | 0.6 |
| 3 |   |   |   | 0.2 | 0.4 |
| 4 |   |   |   |   | 0.2 |

FIG. 19C $T_{FL}(i,j)$

| i\j | 1 | 2 | 3 | 4 | 5 |
|---|---|---|---|---|---|
| 0 | 0 | 0 | 1 | 0 | 0 |
| 1 |   | 0 | 1 | 0 | 0 |
| 2 |   |   | 1 | 0 | 0 |
| 3 |   |   |   | 1 | 1 |
| 4 |   |   |   |   | 0 |

| i\j | 1 | 2 | 3 | 4 | 5 |
|---|---|---|---|---|---|
| 0 | 0.0 | 0.1 | 0.7 | 0.9 | 1.0 |
| 1 |   | 0.1 | 0.8 | 0.9 | 1.0 |
| 2 |   |   | 1.0 | 1.0 | 0.9 |
| 3 |   |   |   | 0.1 | 0.2 |
| 4 |   |   |   |   | 0.0 |

METHOD AND APPARATUS FOR VIDEO CUT DETECTION

BACKGROUND OF THE INVENTION

The present invention relates to a method and apparatus for video cut detection and, more particularly, to a method and apparatus for detecting cut points (points at which scenes are switched) from a plurality of image data sequences.

A point of switching a scene in video by a camera ON-OFF operation or cut break (including fade, wipe or the like) of video editing is commonly referred to as a cut point. Camera operations (pan, zoom and so forth) and object movements in video are not regarded as cuts. The detection of such video cut points is called a scene change detection, too, and various methods have been proposed.

A typical method proposed so far is a method in which intensity differences between two temporally successive images $I_t$ and $I_{t-1}$ in a sequence of captured images at their respectively corresponding pixels are calculated and when the sum of absolute values of the intensity differences over the entire frame (which sum is commonly called an inter-frame difference), represented by D(t), is larger than a given threshold value, t is regarded as a cut point (Otsuji, Tonomura and Ohba, "Motion Picture Browsing Using Intensity information," Technical Report of Institute of Electronics, Information and Communication Engineers of Japan, IE90-103, 1991). In this instance, a pixel hanging area, intensity histogram difference, block-wise color correlation, or $\chi^2$ test quantity may sometimes be used as D(t) in place of the inter-frame difference (Otsuji and Tonomura, "Studies of Automatic Video Cut Detection Method," Technical Report of Institute of Television Engineers of Japan, Vol. 16, No. 43, pp. 7–12). This method has a shortcoming of erroneously detecting a rapid object motion or flashlight in video as a cut.

There has also been proposed a method in which the inter-frame difference D(t) is not processed directly with the threshold value but instead a value obtained by processing the inter-frame difference D(t) with various time filters is subjected to the threshold processing (K. Otsuji and Y. Tonomura, "Projection Detecting Filter for Video Cut Detection," Proc. of ACM Multimedia 93, 1993, pp. 251–257). This method is almost free from the problem of false detection of a rapid object motion or flashlight in video.

The prior art possesses such problems as listed below.

A first problem is the incapability of detecting temporally slow scene changes. The reason for this is that according to the conventional cut point detection method, the quantity representing a scene changing ratio is computed from two temporally successive frames alone, hence does not substantially reflect a long-time scene change.

Typical slow scene changes or transitions are special effects that are inserted in videos at their editing stage, such as fade-in, fade-out, dissolve and wipe. The fade-in is a technique which gradually increases the video signal level to cause an image to appear little by little. The fade-out is a technique which gradually decreases the video signal level to cause an image to disappear little by little. The dissolve is a technique which decreases, at the time of transition from a scene A to B, the video signal level of the scene A while at the same time increasing the video signal level of the scene B, thereby causing the scene A to dissolve into the scene B. The wipe is a technique which wipes off the image of the scene A little by little while at the same time causing the image of the scene B to gradually emerge. Since with these special effects, scenes slowly change (complete switching of a scene, for example, takes one second or so), the change cannot be detected by the conventional method of comparing two temporally successive images or frames (spaced around 1/30 sec apart). The reason for this is that the difference between such two temporally successive images in the slow scene change is so slight that it is hard to discriminate if the difference is attributable to noise or the scene change.

A second problem is false detection of flashlight in video as a cut. When a flash is used, the intensity level of the image rises instantaneously, and consequently, the intensity difference between the images before and after the flash is used abruptly increases. Hence, with the conventional cut point detection scheme which regards a sudden increase in the intensity difference as a cut point, the flashlight is erroneously detected as a cut point.

A third problem is misdetection of cut points in telecine-transformed video. The telecine transformation is a film-video conversion which, for televising video stored on film, converts the frame rate of the film (24 frames/s) to the frame rate of the television signal (30 frames/s). According to some telecine transformation schemes, one frame is added for each four frames. Since the frame that is added in this case is produced by combining fields of images before and after the frame, the image change becomes small and the traditional cut point detection method is liable to incur the misdetection of the cut for the same reasons given above with respect to the dissolve.

To overcome the second and third problems mentioned above, there has been proposed a method for preventing the false detection and misdetection of cut points through utilization of a time filter. In the designing of this time filter, however, it is necessary to pre-check what kind of video is to be handled; hence, this method is not suitable for real time processing and prone to false detection of flashlight in telecine-transformed video.

SUMMARY OF THE INVENTION

It is therefore an object of the present invention to provide a video cut point detection method and apparatus which permit the detection of temporally slow scene changes and allow real time processing of a telecine-transformed video and a video containing flashlight by the same scheme.

To attain the above objective, in the video cut point detection method according to the present invention, the distance, $d(t-i, t-j)$, between image data $I_{t-i}$ and $I_{t-j}$ of every pair of those of an image $I_t$ at the current point t and images of J preceding frames in an input image data sequence which satisfy the condition, $0 \leq i < j \leq J$, is calculated and a distance table is prepared which has stored thereon such distances. The distances $d(t-i, t-j)$ on the distance table are used to calculate the scene changing ratio $C(t-j_c)$ of a sequence of images from the frame (t−J) to t including a frame $j_c$, as the scene changing ratio in the frame $(t-j_c)$, and the scene changing ratio $C(t-j_c)$ thus obtained is compared with a predetermined threshold value to determine if the frame $(t-j_c)$ is a cut point.

The video cut point detection apparatus according to the present invention comprises: buffer memory means for sequentially buffering image data of at least J+1 temporally successive frames; inter-image distance calculating means for calculating the distance between the image data of two images $I_{t-i}$ and $I_{t-j}$ in the above-said image data $I_t, I_{t-1}, \ldots, I_{t-J}$ at the current frame t and the J preceding frames in the buffer memory means which satisfy the condition $0 \leq i < j \leq J$; distance table means for storing inter-image distances calculated by the inter-image distance calculating means; scene changing ratio calculating means which refers to the distance table means to calculate the scene changing ratio from a frame (t−j) to the current frame t as the scene changing ratio in a frame $(t-j_c)$; and decision means for comparing the thus calculated scene changing ratio with a predetermined threshold value to determine if the frame $(t-j_c)$ is a cut point.

According to the present invention, the scene changing ratio $C(t-j_c)$ is computed taking into account the frame difference area between two temporally spaced images as well as that between two temporally successive images. This ensures stable detection of cut points. Now, assuming that a scene was switched at the time of an image * in an image data sequence A-B-*-D-E, the images A and B before the cut are similar to each other and the images *, D and E after the cut are also similar to one another; hence, distance d(A,B), d(*,E) and d(D,E) are small, whereas distances d(A,*), d(A,D), d(A,E), d(B,*), d(B,D) and d(B,E) across the image * are large. It is possible to achieve the cut detection by calculating the scene changing ratio through utilization of this property.

With such a scheme, when a scene changes slowly with time by such an effect as fade, dissolve or wipe, the scene transition can be detected. That is, in the image sequence A-B-*-D-E containing temporally slow scene change, the distances or frame differences d(A,D), d(A,B), d(B,D) and d(B,E) between two temporally spaced-apart images take large values; the scene transition can be detected positively using this property.

Moreover, the present invention precludes the possibility of false detection of flashlight in video as a cut. Assuming that an image data sequence containing flashlight is composed of images A, B, *, D, E, . . . and that the image * is brighter than the other images A, B, D and E because of flashlight, the distance d(A,B) between the images A and B is small, but since the intensity level of the image * is higher than those of the images B and D, the distances d(B,*) and d(*,D) take large values. Some of the conventional methods decide the cut point in dependence on whether the distance d(B,*) is larger than a certain threshold value, and hence have the disadvantage of erroneously detecting flashlight as the cut point. The distance d(B,*) is large at the cut point as well, but it is a characteristic feature of flashlight that the distance d(*,D) takes a large value; the utilization of this property will permit discrimination between the cut point and flashlight, and hence will prevent misrecognition of the cut point.

Furthermore, the present invention eliminates the possibility of misdetection in telecine-transformed video. Supposing that of telecine-transformed images A, B, *, D, E, . . ., the images A, B and images *, D, E are different scenes, there is a case where the image * is synthesized by superimposing the images B and E for telecine transformation, in which the prior art often fails to detect a scene change or transition. The reason for this is that the distances d(A,B), d(B,*), . . . d(D,E) between adjacent images do not suddenly increase unlike in the case of ordinary cuts and remain smaller than a predetermined threshold value. In this instance, however, noting that the distance d(B,D) across the image * becomes large, it will be seen that the time * is a cut point.

BRIEF DESCRIPTION OF THE DRAWINGS

FIG. 2 is a diagram showing an image sequence containing a cut;

FIG. 5 is a diagram showing an example of a distance table prepared using the image sequence shown in FIG. 2;

FIG. 6 is a diagram for explaining a feature of the distance table;

FIG. 7 is a diagram showing an example of an image sequence containing a flash image;

FIG. 8 is a diagram showing an example of a distance table produced with the image sequence depicted in FIG. 7;

FIG. 9 is a diagram for explaining a feature of the distance table shown in FIG. 8;

FIG. 10 is a diagram showing an example of a telecine-transformed image sequence containing a cut;

FIG. 11 is a diagram showing an example of a distance table produced with the image sequence depicted in FIG. 10;

FIG. 12 is a diagram for explaining a feature of the distance table shown in FIG. 11;

FIG. 13 is a diagram showing an example of an image sequence containing a fade;

FIG. 14 is a diagram showing an example of a distance table produced with the image sequence depicted in FIG. 13;

FIG. 15 is a diagram for explaining a feature of the distance table shown in FIG. 14;

FIG. 16 is a diagram for explaining an example of a method for obtaining the scene changing ratio from the distance table;

FIG. 17 is a diagram for explaining a method for obtaining the scene changing ratio with the distance table wherein J=5;

FIG. 19A is a diagram showing a template for instantaneous cut detection use;

FIG. 19B is a diagram showing a template for fade detection use;

FIG. 19C is a diagram showing a template for flash detection use;

FIG. 20 is a diagram showing a distance table for comparison with a template;

DESCRIPTION OF THE PREFERRED EMBODIMENTS

An embodiment of the present invention will hereinafter be described with reference to the accompanying drawings.

Figure 1:
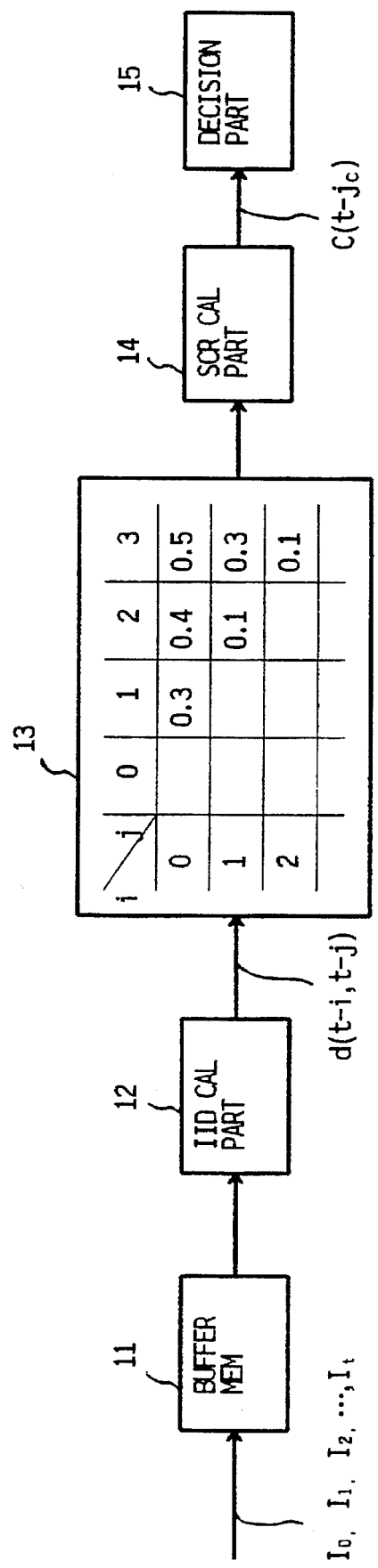
FIG. 1 is a block diagram illustrating the construction of the cut detection apparatus according to the present invention in terms of its principle of operation.

FIG. 1 illustrates in block form the basic configuration of the present invention. In FIG. 1, a sequence of image data $I_0, I_1, \ldots, I_t$ captured from an image signal source (not shown) at a proper sampling rate is input into a buffer memory 11. The image data captured for each frame will hereinafter be referred to as image data of one frame, and the image data of such a sequence of frames are assigned a sequence of frame numbers corresponding to discrete time points $0, 1, \ldots, t-1, t$. The image sampling rate, image format and image size may be arbitrary. That is, the NTSC standard video signal may be sampled at the rate of 30 frames/sec or at a lower sampling rate. The image data sequence may be formed by analog signals as in the NTSC or digital signals. The external image signal source may be an image file stored in a storage such as a hard disk or CD-ROM. The image data frames $I_0, I_1, \ldots$ are sequentially input into the buffer memory 11, which always temporarily buffers J+1 frames of image data $I_t, I_{t-1}, \ldots, I_{t-J}$ at the current point t to J-th one going back therefrom. The buffer memory 11 may be formed by a shift buffers array, for instance, and it buffers the input frames of image data while shifting them frame by frame and abandons the older frame of image data. Consequently, the buffer memory 11 always holds a predetermined number of frames of image data in the order of their input. Incidentally, the buffer memory 11 may also be of the type that stores secondary data which is obtained by processing image data of each frame, such as intensity histogram or color histogram data, or edge information. The image data mentioned herein generically may refer to such secondary data as well.

An inter-image distance calculating part 12 calculates, upon each input thereinto of the image data $I_t$, the distance between two frames of image data $I_{t-i}$ and $I_{t-j}$, that is, the inter-image distance $d(t-i, t-j)$ for $i=0$ and $j=1, 2, \ldots, J$, for instance, as described later on. The inter-image distance (IID) is a quantity which represents what is called a "difference" between two images; when the two images $I_{t-i}$ and $I_{t-j}$ are exactly the same, $d(t-i, t-j)=0$, and the larger the "difference" is, the larger the value the distance takes. The inter-image distance $d(t-i, t-j)$ which is outputted from the inter-image distance calculating part 12 is stored in a distance table memory part 13. Upon each writing of the image data $I_t$ of a new frame into the buffer memory 11, the inter-image distance calculating part 12 calculates the inter-image distance between the input image data $I_t$ and each of the images $I_{t-1}, I_{t-2}, \ldots$ of the other frames stored in the buffer memory 11 and updates the contents of the distance table memory part 13. The distance table memory part 13 temporarily holds the distance $d(t-i, t-j)$, calculated for i and j, between every pair of images which satisfy the condition $0 \leq i < j \leq J$ at the time point (the frame number) t. In the description given hereafter, the distance table which is produced in the distance table memory part 13 will also be denoted by the same reference numeral 13. FIG. 1 shows the case where J=3. The inter-image distances $d(t-i, t-j)$ which are calculated in the distance calculating part 12 for i=0 and $j=1, 2, \ldots, J$ upon each input of the new image $I_t$ into the buffer memory 11 are written into the distance table 13 at positions (0, j) (corresponding to addresses of the table memory part 13), respectively, while at the same time every distance data $d(t-i, t-j)$ specified so far by the position (i, j) in the distance table 13 is shifted to a position (i+1, j+1) in the distance table 13, and the data whose shifted position (i+1, j+1) is outside the range of $0 \leq i+1 < j+1 \leq J$ is discarded.

A scene changing ratio calculating part 14 calculates a scene changing ratio $C(t-j_c)$ while referring to the distance table 13. The scene changing ratio $C(t-j_c)$ is a quantity which represents the certainty of the so-called cut point; in the embodiment, the scene changing ratio takes a value in the range of −1 to 1, and the closer to 1 it is, the higher the probability of a cut. When the scene changing ratio $C(t-j_c)$ is larger than a given threshold value, the decision part 15 decides that the frame $t-j_c$ is a cut point. As the function that defines the scene changing ratio, an optimum function is chosen according to the kind of cuts to be handled as described later on.

A description will be given of operations of the inter-image distance calculating part 12, the distance table memory part 13 and the scene changing ratio calculating part 14 on the basis of their specific operative examples.

Now, assume that frame-by-frame image data $I_{t-7}, I_{t-6}, \ldots, I_t$ held in the buffer memory 11 at the current time point t are sequenced as shown in FIG. 2. In FIG. 2, the frames $I_{t-7}, I_{t-6}, I_{t-5}$ and $I_{t-4}$ are each an image which is black over the entire area of the frame (the intensity value of every pixel being the minimum value 0). The frames $I_{t-3}, I_{t-2}, I_{t-1}$ and $I_t$ are each an image which is white over the entire area of the frame (the intensity value of every pixel being the maximum value $B_{MAX}$). In this instance, the frame number (corresponding to the time point) t−3 corresponding to the image $I_{t-3}$ is a cut point $t_c$.

A description will be given first of some examples of functions that are used to define the inter-image distance which is calculated in the inter-image distance calculating part 12.

A first distance function uses the following sum total of absolute values of inter-frame differences at all pixel positions (x, y):

$$d(t-i, t-j) = \Sigma_{x,y} |I_i(x, y) - I_j(x, y)| / (B_{MAX} \times P) \tag{1}$$

where P is the total number of pixels forming one frame area and $I_i(x, y)$ and $I_j(x, y)$ are intensity values at pixels (x, y) of the images $I_{t-i}$ and $I_{t-j}$. In this example, the sum total of the inter-frame differences are normalized by the brightness in the case where all the pixels have the maximum intensity value $B_{MAX}$. Consequently, the distance is within the range of $0 \leq d(t-i, t-j) \leq 1$. For example, setting $B_{MAX}=255$, the distance between the images $I_0$ and $I_4$ in FIG. 2 is calculated to be $d(t, t-4) = \Sigma_{x,y} |0 - B_{MAX}| / (B_{MAX} \times P) = 1.0$.

A second distance function is implemented by a method which compares intensity or color histograms of two images. The intensity histogram is expressed by the number of pixels which belong to each of N classes into which the intensity levels of respective pixels forming the image of one frame are classified, which number of pixels belonging to each class is called an accumulated value or frequency. Letting the intensity histogram of the images $I_{t-i}$ and $I_{t-j}$ be represented by $H_i(n)$ and $H_j(n)$, respectively, where $n=1, 2, \ldots, N$, the distance function is expressed by the following equation:

$$d(t-i, t-j) = \sum_{n=1}^{N} |H_i(n) - H_j(n)| \tag{2}$$

where N is the step number of the histogram. In the case of the color histogram, letting the histograms of R, G, and B signal levels be represented by $H_R(n)$, $H_G(n)$ and $H_B(n)$, respectively, the inter-image distance is expressed by the following equation:

$$d(t-i, t-j) = \sum_{n=1}^{N} \{|H_{Ri}(n) - H_{Rj}(n)| +$$

$$|H_{Gi}(n) - H_{Gj}(n)| + |H_{Bi}(n) - H_{Bj}(n)|\} \quad (3)$$

Figure 3A:
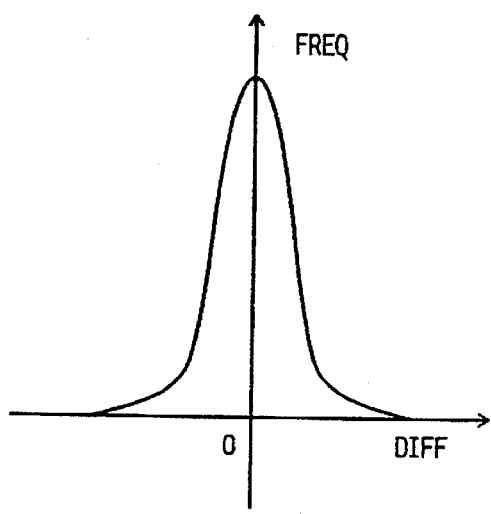
FIG. 3A is a graph showing an example of the histogram of differences between two images with no cut present between them.
Figure 3B:
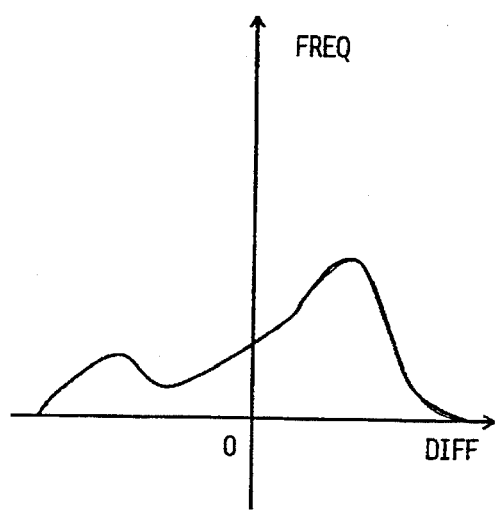
FIG. 3B is a graph showing an example of the histogram of differences between two images with a cut present between them.

A third distance function is one that uses, as $d(t-i, t-j)$, a statistical quantity which represents a deviation of the differences between respective pixels of the images $I_{t-i}$ and $I_{t-j}$ from the center of a difference histogram. At first, a difference $\delta(x, y) = I_i(x, y) - I_j(x, y)$ between the two images $I_{t-i}$ and $I_{t-j}$ is calculated for all the pixels forming them. Here, $I_i(x, y)$ and $I_j(x, y)$ represent intensity levels at the pixels $(x, y)$ of the images $I_{t-i}$ and $I_{t-j}$, respectively. In FIGS. 3A and 3B there are shown examples of this difference histogram. FIG. 3A shows a typical histogram configuration in the case where the images $I_{t-i}$ and $I_{t-j}$ belong to the same scene, that is, where no cut point is present between the two images. As depicted in FIG. 3A, even if an object moves a little in video, changes in the intensity levels at most of the pixels are small; hence, the differences converge to the vicinity of zero and the accumulated value becomes smaller with an increase in the distance from zero. FIG. 3B shows an example of a histogram configuration in the case where a cut point is present between the images $I_{t-i}$ and $I_{t-j}$. Unlike in FIG. 3A, the histogram has no steep peak near zero but has a high, spread-out tail; thus, the distance function needs only to be defined so that the higher the tail of the histogram is, the longer the inter-image distance becomes. To implement the statistical quantity which increases the distance $d(t-i, t-j)$ as the tail of the histogram becomes higher, a standard deviation $\epsilon$ of the differences $\delta(x, y)$ can be used as the distance function as expressed by the following equation:

$$d(t-i, t-j) = \epsilon = \{\Sigma_{x,y}[\delta(x,y) - \delta']^2\}^{1/2} \quad (4)$$

where $\delta'$ is the mean value of differences $\delta(x,y)$ for all the pixels.

A fourth distance function is one that uses, as the distance, a count value of the number of pixels where the absolute values of the differences $\delta(x,y)$ between the images $I_{t-i}$ and $I_{t-j}$ exceed the standard deviation as expressed by the following equation:

$$d(t-i, t-j) = CNT_{PIX}\{|\delta(x,y)| > \epsilon\} \quad (5)$$

In this example, the distance function has been explained in connection with the case of using a standard deviation $\epsilon$ of the intensity differences between the two images $I_{t-i}$ and $I_{t-j}$ from which an inter-image distance is to be obtained. However, it is also possible to use a standard deviation $\epsilon_m$ of the intensity differences $\delta(x,y)$ between the images $I_{t-i-m}$ and $I_{t-j-m}$, which are m-th frame preceding the images $I_{t-i}$ and $I_{t-j}$, and determine the inter-image distance as a count value of the pixels where the absolute values of the intensity differences between the images $I_{t-i}$ and $I_{t-j}$ exceed $\epsilon_m$ as expressed by $$d(t-i, t-j) = CNT_{PIX}\{|\delta(x,y)| > \epsilon_m\} \quad (5')$$

where m is a constant integer equal to or greater than 1. It should be noted that if m is selected to be 0, the expression (5') would be equivalent to the expression (5).

A fifth distance function is used to prevent false detection of cuts which is caused by camera shake or jerk. The standard deviation $\epsilon_k$ of the differences $\delta(x,y)$ between images $I_{t-i-k}$ and $I_{t-j-k}$ spaced at a frame interval $(j-i)$ is calculated for each of k=1, 2, ..., n (where n is an integer equal to or greater than 1 and preferably about 4 or 5). In this instance, the distance that can be used is a count value of the number of pixels where the differences $\epsilon(x,y)$ between the images $I_{t-i}$ and $I_{t-j}$ exceed the mean value $T = \Sigma_k \epsilon_k/n$ of the standard deviations $\epsilon_k$ as expressed by the following equation:

$$d(t-i, t-j) = CNT_{PIX}\{\delta(x,y) > T\} \quad (6)$$

Figure 4:
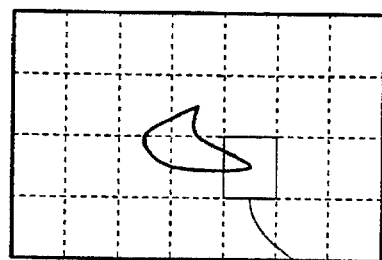
FIG. 4 is a diagram for explaining block matching between two images.
Figure 4:
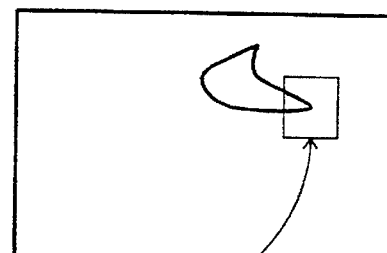

A sixth distance function is implemented by a method which splits the image $I_{t-i}$ into blocks of a predetermined size as shown in FIG. 4, makes a check to determine if there is an area in the image $I_{t-j}$ each block matches, counts the blocks which do not match any areas in the image $I_{t-j}$ and uses the count value as the distance $d(t-i, t-j)$. In other words, the position on the image $I_{t-j}$ to which a certain block of the image $I_{t-i}$ has moved is detected and the number of blocks that could not be detected as having moved is counted; and this count value is used as the distance. The matching of each block (p×q pixels, for example) in the image $I_{t-i}$ with an arbitrary area on the image $I_{t-j}$ is defined by such a function as mentioned below. For example, the arrangement of intensity levels of the p×q pixels of the block is used as one vector, the arrangement of intensity levels of the area of the same size on the image $I_{t-j}$ for comparison is used as another vector, and the distance between these two vectors is expressed by the following equation:

$$D = \Sigma_{p,q}\{b_i(p, q) - b_j(p, q)\}^2$$

When the distance D is smaller than a predetermined threshold value $D_{th}$, it is decided that the block and the area match each other, whereas when the distance D is larger than the threshold value $D_{th}$, it is decided that they do not match. Upon each check of the matching distance, the area for comparison on the image $I_{t-j}$ is shifted at a pitch of a predetermined number of pixels; this is repeated over the entire area of the image $I_{t-j}$. With respect to the other blocks of the image $I_{t-i}$, too, a check is similarly made to determine which area in the image $I_{t-j}$ each block matches, and the number of blocks that do not match is used as the distance between the two images. Accordingly, the inter-image distance can be expressed by the following equation:

$$d(t-i, t-j) = CNT_{BLK}\{D > D_{th}\} \quad (7)$$

Next, a description will be given of the distance table 13. The distance table 13 is a tabulated representation of the inter-image distance $d(t-i, t-j)$ calculated by the inter-image distance calculating part 12 in the form of a J (i=0, ..., J−1) by J (j=1, ..., J) matrix. The size of this table is called J. The distance table 13 is spread over an area allocated therefor on a memory in a computer, for instance; for efficient use of the memory, a data area that has become unnecessary is used by writing new distance data over it.

FIG. 5 shows, as a table which is obtained at time point t, values of the inter-image distance $d(t-i, t-j)$ in the image data sequence of FIG. 2 calculated by Eq. (1) for all pairs of integers i and j within the range of $0 \leq i < j \leq 7$. The distribution of inter-image distances $d(t-i, t-j)$ generally possesses symmetry and $d(t-i, t-j) = d(t-j, t-i)$ holds; hence, there is no need of calculation for the area where i>j in the distance table of FIG. 5. Moreover, it is possible to calculate only the distances $d(t-i, t-j)$ which satisfy such a condition as $0 < j-i \leq 3$ in the distance table of FIG. 5 as described later on.

FIG. 6 is a diagram showing a feature of the distance table depicted in FIG. 5. When the time point, i.e. the frame number (t–j_c), is a cut point (j_c=4, in FIG. 5), the distance table has a feature that the values of the inter-image distance in the area A1 are larger than those in the areas A2 and A3. The area A1 is one that satisfies a condition i<j_c≤j, and the inter-image distance at the lower left-hand corner of the area corresponds to d(t–j_c–1, t–j_c). The area A2 is one that satisfies a condition i<j≤j_c–1, and the area A3 satisfies a condition j_c≤i<j.

FIG. 7 shows another example of the image data sequence, in which flashlight is present in an image $I_{t-4}$ corresponding to a frame (t–4). The distance table that is obtained with Eq. (1) for this image data sequence at time point t is such as shown in FIG. 8. FIG. 9 is a diagram for explaining the feature of this distance table. When flashlight is present in a frame (t–j_F), the inter-image distance values in the areas A1, A2 and A3 are smaller than in the area A4 defined by i=j_F and j=j_F.

FIG. 10 shows another example of the image data sequence, which contains a cut in a telecine-transformed image sequence. In FIG. 10, the image of the frame (t–4) is a superimposed version of images $I_{t-3}$ and $I_{t-5}$, and even-numbered fields form black striped images and odd-numbered fields white striped images. FIG. 11 shows the distance table which is obtained with Eq. (1) for the image data sequence at time point t and FIG. 12 is a diagram showing a feature of this distance table. When such a defocused telecine-transformed image as the image $I_{t-4}$ is present in a frame (t–j_T) (j_T=4 in FIG. 10), the inter-image distance values in the areas A2 and A3 are larger than that in the area A1 and the inter-image distance value in the area A4 defined by i=j_T and j=j_T is substantially intermediate between the values in the areas A2 and A3 and in the area A1 as shown in FIG. 12.

FIG. 13 shows an example of an image data sequence which contains a fade. In FIG. 13, images $I_{t-7}$ and $I_{t-6}$ are images that are black over the entire areas thereof, and images $I_{t-2}$, $I_{t-1}$ and $I_t$ are white over the entire areas thereof; the scene gradually grows brighter with the intermediate images $I_{t-5}$, $I_{t-4}$ and $I_{t-3}$. FIG. 14 shows the distance table that is obtained with Eq. (1) for the image data sequence at time point t, and FIG. 15 is a diagram showing its feature. When the scene slowly changes with time, the inter-image distance tends to decrease with an increase in the distance from the upper right-hand corner of the area A shown in FIG. 15.

It must be noted here that the inter-image distance data d(t–i, t–j) at each position (i, j) in the distance table generated at point t is identical with the distance data at the position (i–1, j–1) in the distance table generated at the immediately previous time point (t–1), as is evident from the fact that the distance data d(t–i, t–j) can be rewritten to d(t–1–i+1, t–1–j+1). That is, upon each updating of the time t, the inter-image distance data d(t–i, t–j) at the position (i, j) in the distance table is shifted to the position (i+1, j+1), while at the same time new distance data d(t, t–1), d(t, t–2), ..., d(t, t–J) are written into positions (0, 1), (0, 2), ..., (0, J) in the table. In this instance, data whose shifted position (i+1, j+1) is outside the table is discarded. Thus, the inter-image distances that need to be calculated to generate the distance table at each time point t are only d(t, t–1), d(t, t–2), ..., d(t, t–J).

Scene Changing Ratio

Next, the scene changing ratio calculating part 14 will be described. The scene changing ratio C(t–j_c) is calculated with a predetermined function, using data of the inter-image distance table generated at time point t with images of J preceding frames. The scene changing ratio C(t–j_c) calculated for time point t is a quantity of evaluation which is used to determine if the image of a preceding frame j_c-th from the current time point is a cut; when this quantity is larger than a predetermined threshold value C_th, it is decided that the image is a cut. The scene changing ratio calculating part 14 calculates the scene changing ratio through utilization of the aforementioned features that the distance table 13 has for the cut point, the flashlight, the telecine defocusing and the slow scene change. The decision part 15 compares the thus calculated scene changing ratio C(t–j_c) with the threshold value C_th to determine if the frame (t–j_c) is a cut. Next, a description will be given of examples of the function that define the scene changing ratio in the scene changing ratio calculating part 14. In the following, j_c is a predetermined fixed integer which satisfies a condition 1≤j_c≤J.

As is evident from the distance table of FIG. 5 which is generated with the image sequence containing an instantaneous cut and the distance table of FIG. 11 which is generated with the telecine-transformed image sequence containing a cut, when a scene changing point (i.e. a cut point) is present, the inter-image distance value in the area A1 of the table is large but the distance values in the areas A2 and A3 are small. It could be understood that the distance table of FIG. 14 with the image sequence containing a fade also has the same tendency as mentioned above, by applying to the distance table the same areas A1, A2 and A3 as those in FIGS. 6 and 13. In contrast, in the distance table of FIG. 8 for the image sequence containing flashlight, the distance values in the areas A1, A2 and A3 are all substantially the same. Then, noting these areas A1, A2 and A3, a distance table of the size J, such as shown in FIG. 16, is generated at the current time point t with images of J previous frames within the ranges of 0≤i<j≤J and j–i≤g, where g is a predetermined fixed integer which satisfies a condition 0<g≤J. FIG. 16 shows the case where g=j_c–1. The value j_c is set to the minimum integer larger than J/2, for instance. In this distance table, the functions for the scene changing ratio are defined as follows:

$$C(t-j_c)=\{a(j_c)-\beta MAX[b(j_c), b'(j_c)]\}/S \qquad (8)$$

a(j_c)=Σ_{i,j}d(t–i, t–j) for 0≤i<j_c≤j≤J, j–i≤g
b(j_c)=Σ_{i,j}d(t–i, t–j) for 0≤i<j≤j_c–1, j–i≤g
b'(j_c)=Σ_{i,j}d(t–i, t–j) for j_c≤i<j≤J, j–i≤g In the above, a(j_c) is the sum of all inter-image distances indicated by crosses in the area A1, b(j_c) is the sum of all inter-image distances indicated by triangles in the area A2 and b'(j_c) is the sum of all inter-image distances indicated by triangles in the area A3. MAX[b(j_c), b'(j_c)] represents that a larger one of the values b(j_c) and b'(j_c) is taken. S represents the distance data number (the number of crosses) in the area A1; in the example of FIG. 16, S=(j_c–1)j_c/2. When J is an odd number, the areas A2 and A3 have the same number of distance data. β is a coefficient which is used to make the data number S in the area A1 equivalent to the data number in the area A2 or A3. According to the setting of the areas A1, A2 and A3 in FIG. 16, when J is odd, the data numbers in the areas A1, A2 and A3 are all equal; hence, β=1.

When g=J, the entire area of the distance table including the upper right corner (0, J) is used. In such an instance, S=j_c(J–j_c+1) holds and β=2(J–j_c+1)/(j_c–1) is about 2. In the area A1 of the distance tables shown in FIGS. 2, 10 and 13, the distance value are large almost all over the area; hence, even if the corner area of a certain size including the position (0, J) at the upper right corner is removed by selecting g so that g is smaller than J, it is possible to retain the feature that the distance value in the area A1 is larger than those in the areas A2 and A3. Thus, Eq. (8) permits cut detection. The distribution of distance values is shifted by one step in the lower right direction upon each updating of the time t as referred to previously, and consequently, when g is smaller than J, the inter-image distances that must be newly calculated for the generation of the distance table upon each updating of the time t are only g distance values d(t, t−1), d(t, t−2), ..., d(t, t−g); thus, the quantity of computation can be reduced without impairing the cut detection performance. The smaller the value g is, the more the required quantity of computation is reduced, but when the value g is too small, the number of cut detection errors increases and, therefore, the value g may preferably be in the range of $j_c-1 \leq g < J$.

When the scene changing ratio $C(t-j_c)$, obtained by substituting into Eq. (8) the data of the distance table of FIG. 16 generated at time point t, is larger than the predetermined threshold value $C_{th}$, it is decided that a scene change (or cut) occurred in the image of the preceding frame $(t-j_c)$ which is $j_c$-th from the current time point.

In FIG. 17 there are shown examples of the areas A1, A2 and A3 on the distance table when J=5 and $g=j_c=3$. The data number S in the area A1 is 6 and the data numbers in the areas A2 and A3 are both 3, hence the coefficient β needs only to be set to 2. As will be understood from FIG. 17, the functions $C(t-j_c)$, $a(j_c)$, $b(j_c)$ and $b'(j_c)$ are given by the following equations:

$$C(t-j_c) = \{[a(j_c) - 2MX[b(j_c), b'(j_c)]\}/6 \quad (9)$$
$$a(j_c) = d(t-2, t-3) + d(t-1, j-3) + d(t, t-3) +$$
$$d(t-2, t-4) + d(t-1, t-4) + d(t-2, t-5)$$
$$b(j_c) = d(t, t-1) + d(t, t-2) + d(t-1, t-2)$$
$$b'(j_c) = d(t-3, t-4) + d(t-3, t-5) + d(t-4, t-5)$$

In the above, $a(j_c)$ is the sum of the distances d(t−i, t−j) belonging to the area A1 shown in FIG. 17, $b(j_c)$ is the sum of the distances d(t−i, t−j) belonging to the area A2 and $b'(j_c)$ is the sum of the distances d(t−i, t−j) belonging to the area A3. Accordingly, when Eq. (1) is used as the inter-image distance function, the scene changing ratio $C(t-j_c)$ always takes a value in the range of $-1 \leq C(t-j_c) \leq 1$.

As described above, when the frame $(t-j_c)$ has a cut point, the value $a(j_c)$ is larger than those $b(j_c)$ and $b'(j_c)$, hence the scene changing ratio $C(t-j_c)$ takes a positive value. In other words, $a(j_c)$ is the sum of inter-image distances between all corresponding pixels of two images selected at intervals of three or less frames, one from the first three and the other from the second three images of a six-image sequence, and if the scene underwent a substantial change at time $(t-j_c)$, the sum $a(j_c)$ ought to be large. $b(j_c)$ is the sum of distances of all pairs of images in a total of three images of the frame $(t-j_c)$ and two frames preceding it; the smaller the scene change before the frame $(t-j_c)$ is, the smaller the sum $b(j_c)$ is. $b'(j_c)$ is the sum of distances of all image pairs in three images after the frame $(t-j_c)$, the smaller the scene change after the frame $(t-j_c)$ is, the smaller the sum $b'(j_c)$ is.

To apply concrete numerical values to Eq. (9) on the basis of the distance table of FIG. 17, for instance, the area pattern map of FIG. 17 is laid on top of the table of FIG. 5 with the position (i, j) of the former held at the position (i, j)=(6, 7) of the latter, and the scene changing ratio $C(t-j_c)$ obtainable at time point (t−1) ($j_c$=3 in FIG. 17) is calculated using the data in the corresponding area as follows:

$a(3) = 0+0+0+1+1+1 = 3$ $b(3) = 0+1+1 = 2$ $b'(3) = 0+0+0 = 0$ $C(t-1-3) = (3-2 \times 2)/6 = -1/6 = -0.16$ At the next time point t, the area pattern map of FIG. 17 is shifted one step toward the upper left-hand side. As the result of this, pieces of data 0, 0, 1 at the positions (1, 2), (1, 3) and (1, 4) are written as the new distance data into the positions (0, 1), (0, 2) and (0, 3) in FIG. 17. The scene changing ratio in this instance is calculated as follows:

$a(3) = 1+1+1+1+1+1 = 6$ $b(3) = 0 + 0 + 0 = 0$ $b'(3) = 0 + 0 + 0 = 0$ $C(t-3) = (6 - 2 \times 0)/6 = 1.0$ In these two examples of calculation, the value of the scene changing ratio C(t−4) calculated from the distance table at time point (t−1) is negative, indicating that no cut was found. In contrast, the scene changing ratio calculated from the distance table at the time point t is 1; this means that a cut would be detected in the third previous frames (t−3) at time t if the threshold value $C_{th}$ is set to 1/16. Incidentally, the threshold value $C_{th}$=1/16 is a value experimentally determined to minimize the number of decision errors.

As will be seen from this example, the scene changing ratio $C(t-j_c)$ takes a value close to 1 at the cut point. Furthermore, for example, when camera shake or pan (horizontal camera operation) is present in video, it is often erroneously detected as a cut point. The reason for this is that also when camera shake or pan is present, $a(j_c)$ takes a large value and $b(j_c)$ and $b'(j_c)$ also take large values; in Eq. (2) they cancel each other, reducing the value of the scene changing ratio $C(t-j_c)$.

To detect cuts in a sequence of actual input images by applying Eq. (9) to the distance table of FIG. 17, it is necessary that the inter-image distances d(t−i, t−j) in the areas A1, A2 and A3 shown in FIG. 17 be always obtained in a total of only six frames including the current (t) and five preceding ones; in addition, upon each updating of the time point t, only the inter-image distances at the positions (0, 1), (0, 2) and (0, 3) in FIG. 17 need to be newly calculated and all the pieces of data held so far are shifted one step toward the lower right side.

Next, a description will be given of the scene changing ratios obtainable at time points (t−1), t and (t+1) calculated with Eq. (9) through application of the aforementioned area pattern map in FIG. 17 to the distance table of FIG. 8 generated with the FIG. 7 image sequence containing flashlight.

$C(t-1-3) = (3-2 \times 2)/6 = -1/6 = -0.16$ $C(t-3) = (3-2 \times 2)/6 = -1/6 = -0.16$ $C(t+1-3) = (2-2 \times 2)/6 = -2/6 = -0.3$ As will be seen from the above, in both cases of the scene changing ratios obtainable at time points (t−1) and t, since three "1's" on $i=j_F$ in the area A4 in FIG. 9 and three of four "1's" on $j=j_F$ cancel each other, the scene changing ratios C(t−4) and C(t−3) are smaller than the threshold value 1/16; hence, the flashlight will not be erroneously detected as a cut point. With the prior art, since the inter-image distance d(t–3, t–4) in FIG. 8 takes a large value, the frame (t–4) is often erroneously decided as containing a cut point.

In the case where the image sequence contains a telecine-defocused image as shown in FIG. 10, the distance values in the area A4 in FIG. 12 are intermediate values, but since the distance values in the area A1 are large, the scene changing ratio $C(t-j_c)$ takes a value close to 1. The following is the scene changing ratios obtainable at the time points (t–1), t and (t+1) calculated using Eq. (9), with the area pattern map of FIG. 17 laid on top of the distance table of FIG. 11 at temporal positions (t–1), t and (t+1) in the same manner as in the above.

$$C(t-1-3)=(4.5-2\times 1)/6=5/12=0.4$$

$$C(t-3)=(4.5-2\times 1)/6=5/12=0.4$$

$$C(t+1-3)=(2-2\times 2)/6=-1/3=-0.3$$

Since $C(t-3)>1/16$ and $C(t-4)>1/16$, the frames (t–3) and (t–4) are correctly decided to be cut points. That is, in this example, a cut extends over a plurality of frames. When the inter-image distances are small like d(t–3, t–4) and d(t–4, t–5) in FIG. 11, the prior art often fails to detect the frames (t–4) and (t–5) as cut points.

When the image sequence contains a plurality of slowly changing images as by fade as shown in FIG. 13, the distance value increases toward the upper right-hand corner of the area A1 depicted in FIG. 15; the scene changing ratios $C(t-j_c)$ obtainable at time points (t–1), t and (t+1) calculated using Eq. (9), with the area pattern map of FIG. 17 laid on top of the distance table of FIG. 14 at temporal points (t–1), t and (t+1) in the same fashion as in the above, are as follows:

$$C(t-1-3)=(3.4-2\times 0.8)/6=0.31$$

$$C(t-3)=(3.0-2\times 1.2)/6=0.1$$

$$C(t+1-3)=(2.1-2\times 1.0)/6=0.016$$

Thus, the scene change can correctly be detected.

Incidentally, the following equation (10) may be used as an equation that defines the scene changing ratio $C(t-j_c)$ which the scene changing ratio calculating part 14 calculates.

$$C(t-j_c)=\{a(t)-\beta([b(t)+b'(t)]\}/S \qquad (10)$$

Figure 18:
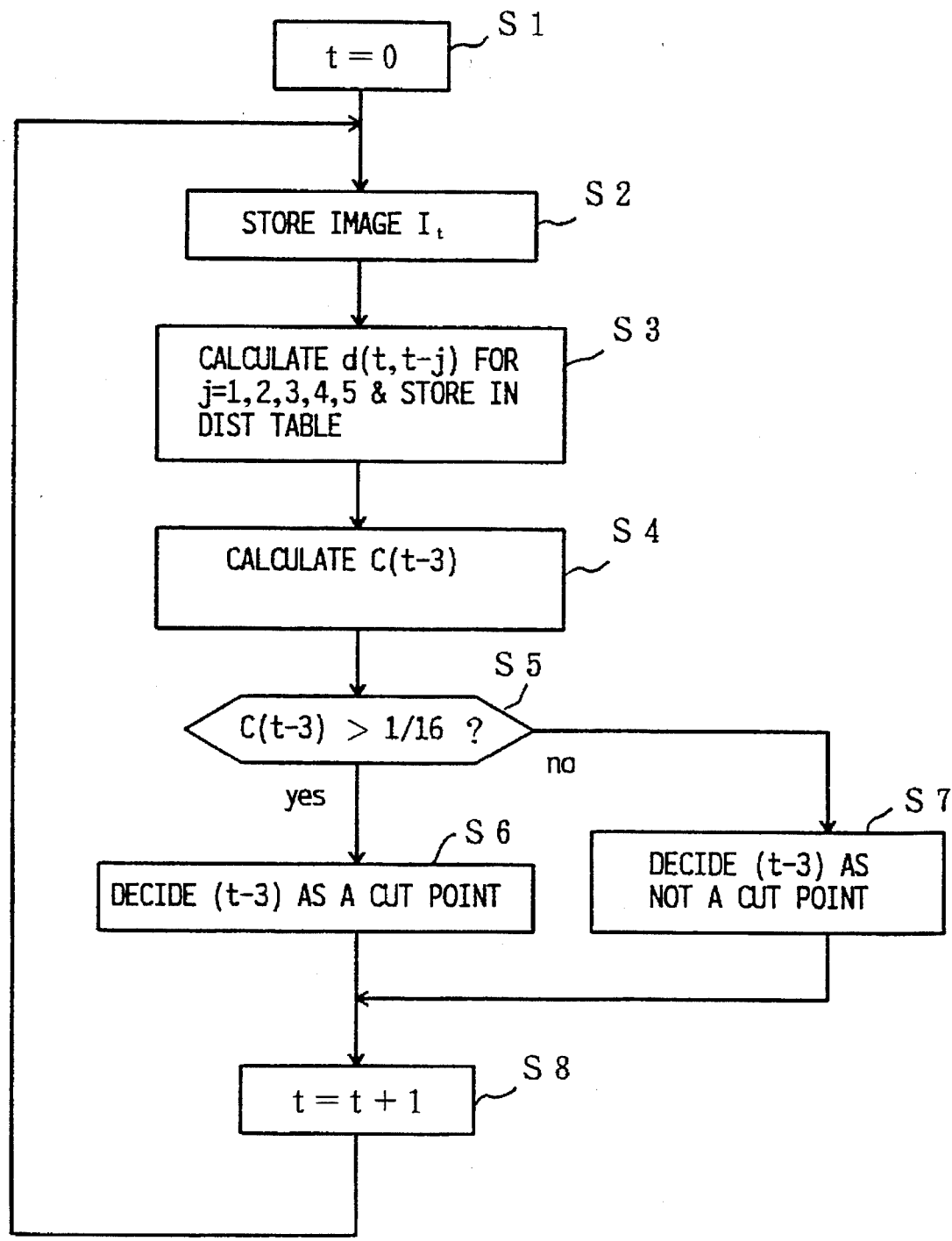
FIG. 18 is a flowchart illustrating the procedure of the cut detection method according to the present invention.

$a(j_c)=\Sigma_{i,j}d(t-i, t-j)$ for $0\leq i<j_c\leq j\leq J$, $j-i\leq g$ $b(j_c)=\Sigma_{i,j}d(t-i, t-j)$ for $0\leq i<j\leq j_c-1$, $j-i\leq g$ $b'(j_c)=\Sigma_{i,j}d(t-i, t-j)$ for $j_c\leq i<j\leq J$, $j-i\leq g$ FIG. 18 is a flowchart showing an embodiment of the method for the real time detection of video cuts in an input image sequence according to the present invention. The real time processing means the capability of performing the video cut detection while displaying, recording and transferring videos at a standard rate. In the following description, the time point t at each input of one frame of image and the frame numbers of a sequence of images are the same and the distance table 13 used is the same as shown in FIG. 17, in which J=5 and $g=j_c=3$.

In step S1 the time point t is initialized to 0. That is, the processing start time is regarded as 0. In step S2 the image at the time point t is read into the buffer memory 11. This processing includes preprocessing of A/D converting the video signal to processable digital data. In step S3 the data d(t–i, t–j) at every position (i, j) in the data areas A1, A2 and A3 in the distance table is shifted to the position (i+1, j+1), then in the inter-image distance calculating part 12, distances d(t, t–j) are calculated for j=1, 2, 3 using Eq. (1), for example, and the thus calculated distance values are stored at positions (0, 1), (0, 2) and (0, 3) in the distance table 13. This scheme differs from the prior art method in that the distances between temporally spaced-apart images, such as d(t, t–2) and d(t, t–3), as well as the distance d(t, t–1) between temporally adjacent images are computed and used for cut detection. In step S4 the data of the distance table 13 is used to calculate the scene changing ratio C(t–3) in the scene changing ratio calculating part 14 using Eq. (9), for instance. In step S5 a check is made to see if the scene changing ratio C(t–3) is larger than the threshold value 1/16; if larger, it is decided that the frame (t–3) is a cut point (step S6), and if not, it is decided that the frame (t–3) is not a cut point (step S7). After this, the time point t is incremented by one and the process returns to step S2.

Incidentally, in the case of calculating the scene changing ratio $C(t-j_c)$ cannot be detected until the time point t as will be seen from the flowchart of FIG. 18, and consequently, a time lag corresponding to $j_c$ frames is necessary in the cut point detection, but this does not present any problems in practice. In the actual processing of FIG. 18, the calculation of the scene changing ratio in step S4 and the subsequent steps S5 through S7 are not performed until the areas A1, A2 and A3 of the distance table shown in FIG. 17 are filled with data by repeating steps S2, S3 and S8 a predetermined number of times. In the case of FIG. 17, the three areas of the distance table 13 are filled with distance data when images of 3 by 5 frames are input after the input of the first image frame. Since usually there is expected no cut in the first tens of video frames, cut detection need not always be carried out over the first tens of frames.

Next, a description will be given of another example of the function that defines the scene changing ratio. As described previously in respect of FIGS. 5, 8, 11 and 14, the inter-image distance data on the distance table has a characteristic distribution according to the kind of the scene change contained in the image sequence. Then, a table or tables of the distance data distributions typical of one or more kinds of scene changes (i.e. cuts) desired to detect are prepared in the scene changing ratio calculating part 14. These tables will hereinafter be called templates. FIGS. 19A, 19B and 19C show examples of an instantaneous cut detection template $T_{CT}(i, j)$, a fade detection template $T_{FD}(i, j)$ and a flash detection template $T_{FL}(i, j)$, any of which has a size of J=5. The scene changing ratio $C(t-j_c)$ in this instance is defined by the similarity between each template and such a distance table as shown in FIG. 20 which is generated upon each input of image data of one frame and having the same size J as does the template. The similarity between the template and the above-mentioned distance table is represented by a cross-correlation coefficient R(d, T). This can be expressed by the following equation:

$$C(t-j_c) = R(d, T) \quad (11)$$
$$= \Sigma_{i,j}\{d(t-i, t-j) - d_{AV}\}\{T(i,j) - T_{AV}\}/(\sigma_d\sigma_T)^{1/2}$$

$d_{AV} = 1/S\Sigma_{i,j}d(t-i, t-j)$: Mean value of $d(t-i, t-j)$ $T_{AV} = 1/S\Sigma_{i,j}T(i,j)$: Mean value of $T(i,j)$ $\sigma_d = 1/S\Sigma_{i,j}\{d(t-i, t-j) - d_{AV}\}^2$: Variance of $d(t-i, t-j)$ $\sigma_T = 1/S\Sigma_{i,j}\{T(i,j) - T_{AV}\}^2$: Variance of $T(i,j)$ where i,j are every pair of values which satisfy $0 \leq i < j \leq J$, S is the number of such pairs (i, j) and $\Sigma_{i,j}$ is the summation operator for all pairs (i, j). Also in this case, the areas of the template and the distance table may be defined by $j-i<g$, where $0<g<J$.

The scene changing ratio calculating part 14 calculates, as the scene changing ratio, with Eq. (11), the similarity R(d,T) between the distance table of such as FIG. 20 generated for each input image frame and a desired one or more of the templates shown in FIGS. 19A, 19B and 19C. When the value of similarity thus calculated is larger than a predetermined threshold value $R_{th}$, it is decided that the corresponding scene change is present in the frame $(t-j_c)$.

Figure 21:
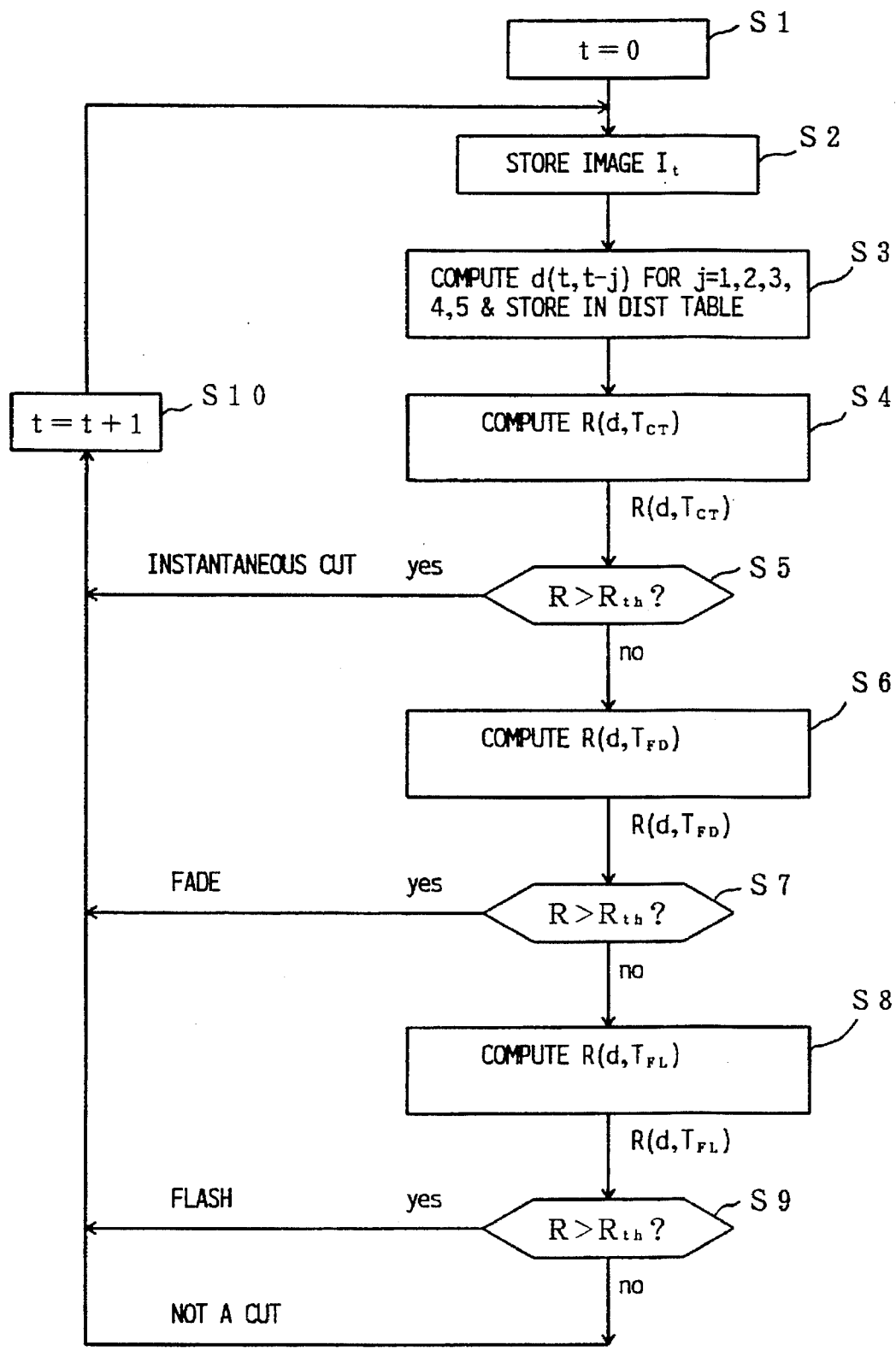
FIG. 21 is a flowchart illustrating the procedure of a method for detecting a desired scene change by use of a template.

FIG. 21 is a flowchart of processing for detecting, through use of the above-mentioned templates, what scene changes (or cuts) are present in which frame in the input image sequence. The basic procedure is the same as in the case of FIG. 18. In this example, however, a flash is added as an event to be detected in the image sequence, though not a cut. In step S1 the time point t is initialized to 0, and in step S2 image data at the current time point t is read into the buffer memory 11. In step S3 the distance data d t-i, t-j) at every position (i, j) on the distance table is shifted to the position (i+1, j+1). Those J+1 image frames from the current to J-th preceding frame, held in the buffer memory 11 are used to calculate the inter-image distances d(t, t-j) (where j=1, 2, . . . , J) on the basis of Eq. (1), and the thus calculated distance values are written into respective positions (i, j) in the table. In this way, the distance table at the current time point t is generated. In step S4 the similarity between the instantaneous cut detection template of FIG. 19A and the distance table at the current time point is calculated using Eq. (11). In step S5 the similarity thus calculated is compared with the predetermined threshold value $R_{th}$. If the former is smaller than the latter, then it is decided that no instantaneous cut is present, and the process goes to step S6, in which the similarity between the fade detection template of FIG. 19B and the distance table at the current time point is likewise calculated using Eq. (11). In step S7 the similarity of the distance table to the fade detection template is compared with the threshold value $R_{th}$. When the similarity is smaller than the threshold value, it is decided that no fade is present, and the process proceeds to step S8, in which the similarity between the flash detection template of FIG. 19C and the distance table at the current time point is calculated using Eq. (11). In step S9 the similarity of the distance table to the flash detection template is compared with the threshold value $R_{th}$. When the similarity is smaller than the threshold value, it is decided that no flash is present, and in step S10 the time point t is updated, after which the process goes back to step S2. When the similarity is larger than the threshold value $R_{th}$ in any of steps S5, S7 and S9, it is decided that the corresponding scene change is present in the frame $(t-j_c)$, then in step S10 the time point is updated, and the process returns to step S2.

The principles of the cut detection scheme according to the present invention have been described in connection with its specific operative examples; the cut detection apparatus which implements the cut detection scheme of the present invention is not limited specifically to the configuration depicted in FIG. 1 but may also be configured as described below.

Figure 22:
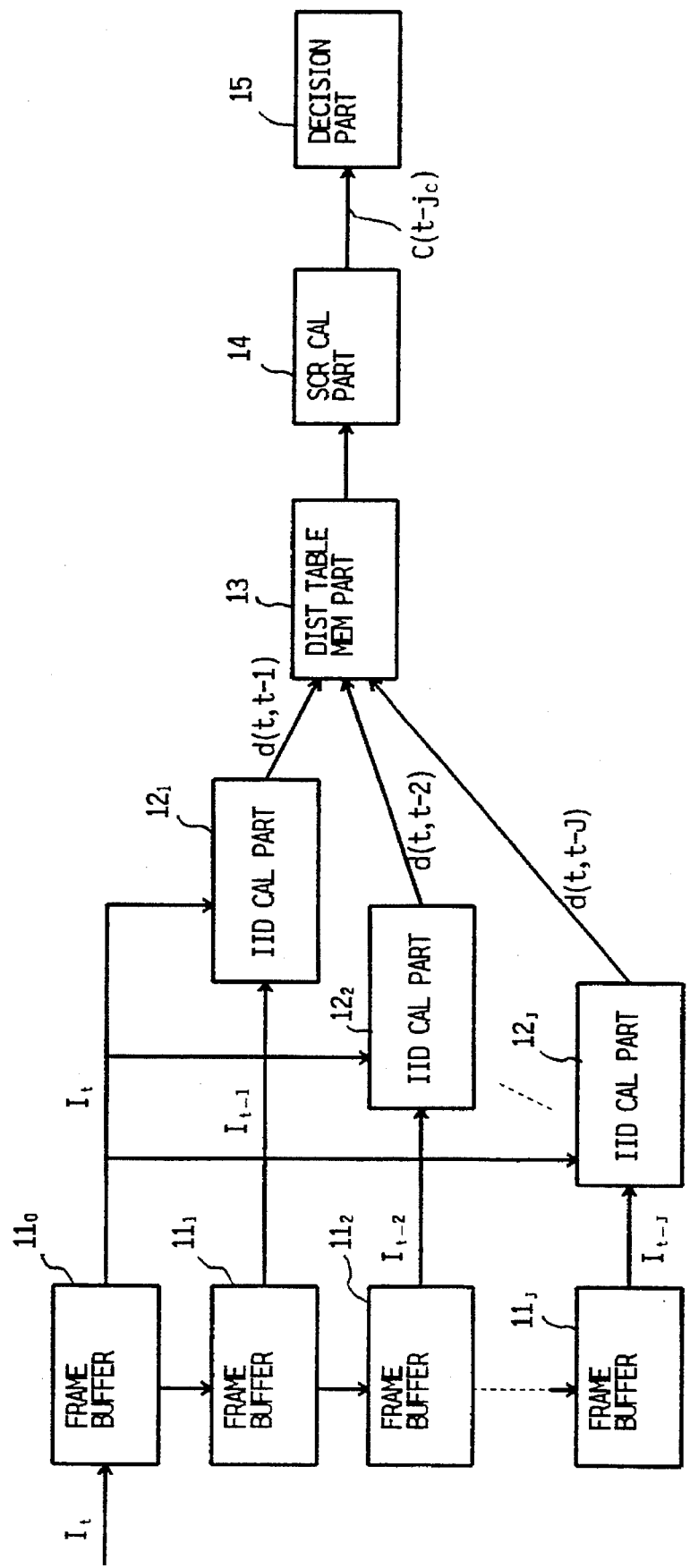
FIG. 22 is a block diagram illustrating another example of the cut detection apparatus according to the present invention.
Figure 23:
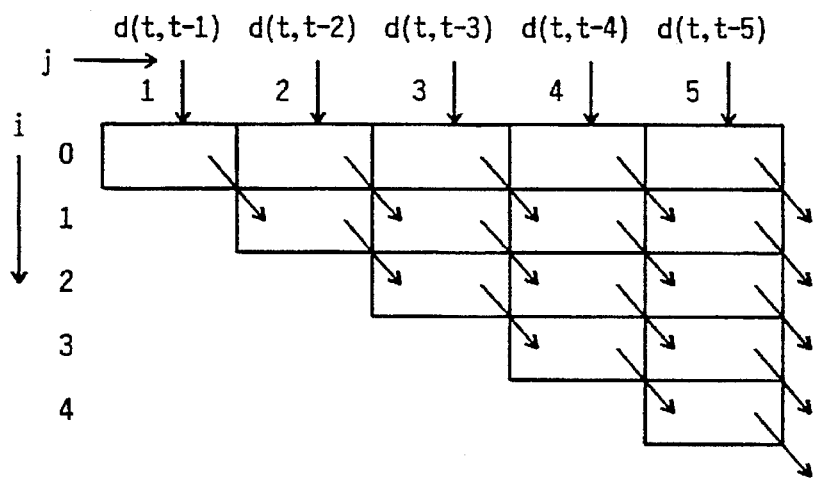
FIG. 23 is a diagram for explaining the production of the distance table.

FIG. 22 illustrates in block form another embodiment of the cut detection apparatus, in which J+1 frame buffers $11_0$–$11_J$ are provided corresponding to the buffer memory 11 in FIG. 1 and J inter-image distance calculating parts $12_1$–$12_J$ are provided corresponding to the inter-image distance calculating part 12 in FIG. 1. Prior to loading a new image frame $I_t$ into the buffer, image frames held so far in the frame buffers $11_0$–$11_{J-1}$ are transferred to the buffers $11_0$–$11_J$ (in consequence of which the image data held in the buffer $11_J$ until then is discarded), after which the new image frame $I_t$ is written into the buffer $11_0$. Upon completion of the loading of the image frames into all the buffers, the inter-image distance calculating parts $12_1$–$12_J$ are supplied with image frames $I_{t-1}, I_{t-2}, \ldots, I_{t-J}$ read out of the frame buffers $11_1$–$11_J$ respectively, and are supplied, in common to them all, with the latest image frame $I_t$ at the current time point from the frame buffer $11_0$; the inter-image distance calculating parts $12_1$–$12_J$ calculate inter-image distances d(t, t−1), d(t, t−2), . . . , d(t, t−J), respectively, using Eq. (1), for instance. These inter-image distance values are provided to the distance table memory part 13, wherein they are written into address areas corresponding to the positions (0, 1), (0, 2), . . . , (0, J) on a distance table of the size J=5 shown in FIG. 23. Prior to this write, however, each data d(t−i, t−j) stored so far at the position (i, j) on the table is shifted to the position (i+1, j+1) as indicated by arrows in FIG. 23. The data that is driven out of the table by this shift is discarded as referred previously. In this way, the scene changing ratio calculating part 14 calculates the scene changing ratio $C(t-j_c)$ on the basis of the aforementioned desired scene changing ratio calculating scheme, using the distance table generated at the current time point t. The decision part 15 compares the scene changing ratio with the threshold value and decides whether a scene change happened or not, depending on the result of the comparison.

The FIG. 22 embodiment calls for the provision of pluralities of frame buffers and inter-image distance calculating parts but permits fast processing of image data on a pipeline basis.

Figure 24:
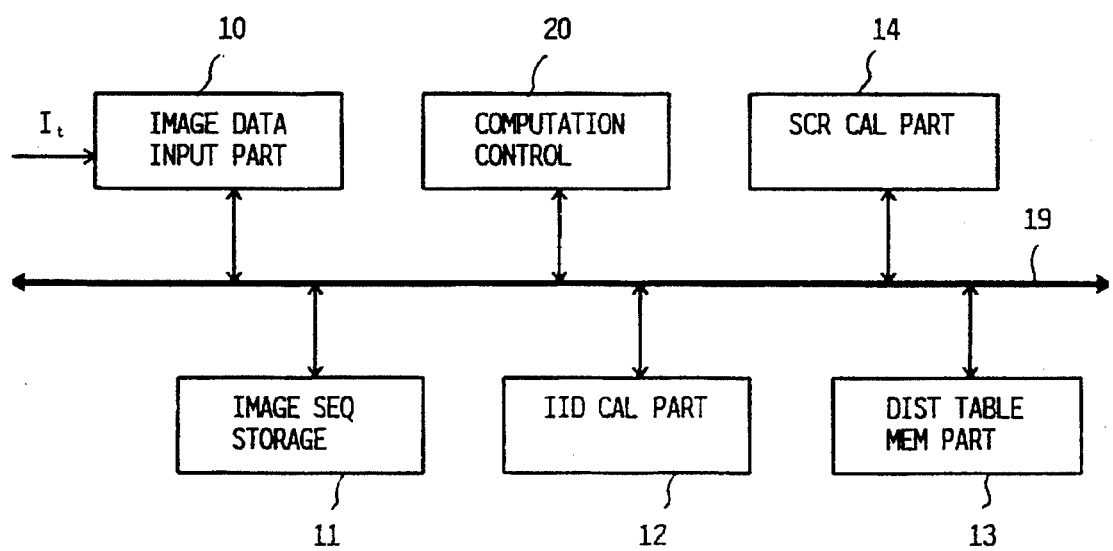
FIG. 24 is a block diagram illustrating still another example of the cut detection apparatus according to the present invention.

FIG. 24 illustrates in block form still another embodiment of the cut detection apparatus. This embodiment is a computerized version of the cut detection apparatus intended to implement the basic construction of FIG. 1 in more practical form. An image sequence storage part 11, the inter-image distance calculating part 12, the distance table memory part 13 and the scene changing ratio calculating part 14 are controlled by a calculation control part (CPU) 20 and connected thereto via a bus 19. An image data input part 10 captures and transfers one frame of the input image data $I_t$ to the image sequence storage part 11 under control of the calculation control part 20. The image sequence storage part 11 is, for example, a main storage part of the computer, wherein there are provided preassigned buffer areas $11_0$–$11_J$ for J+1 frames and images of the latest J+1 frames are held. As in the case of FIG. 22, when the new image frame at the current time point t is input into the input part 10, image data $I_t, \ldots, I_{t-j+1}$ in the areas $11_0$–$11_{J-1}$ (not shown) of the image sequence storage part 11 are respectively written into the areas $11_1$–$11_J$ and then the latest image data is written into the area $11_0$ from the input part 10. Upon completion of the write into the image sequence storage part 11, the calculation control part 20 reads out a pair of image frames $I_t$ and $I_{t-j}$ from the storage part 11, then provides them to the inter-image distance calculating part 12 for calculation of the inter-image distance d(t, t–j) and transfers the calculated distance to the position (0, j) in the table (see FIG. 23) of the distance table memory part 13. This operation is repeated for j=1, 2, ..., J in a sequential order. By this, J new pieces of distance data are provided to the distance table of the distance table memory part 13.

As described above, according to the present invention, the scene changing ratio is computed as an inter-frame difference not only by comparing two temporally successive images but also taking into account the quantity of change between two temporally spaced images, by which a temporally slow scene change can be detected and a telecine-transformed video and a video containing flashlight can be processed in real time through utilization of the common scheme.

It will be apparent that many modifications and variations may be effected without departing from the scope of the novel concepts of the present invention.

What is claimed is:

1. A video cut detection method for detecting a cut point from a video data sequence, comprising the steps of:
   (a) calculating the distance d(t–i, t–j) between image data of every pair of images $I_{t-i}$ and $I_{t-j}$ having a frame interval therebetween equal to or smaller than J in a sequence of latest J+1 frames of images $I_t, I_{t-1}, \ldots, I_{t-J}$ which have been supplied sequentially at current time point t, and generating a distance table having a data of the distance d(t–i, t–j) at each position (i, j) of the table, J being a fixed integer equal to or greater than 3 and i and j being all variable integers within the range of $0 \leq i < j \leq J$;
   (b) calculating a scene changing ratio C(t–$j_c$) for the range from the J-th preceding frame (t–J) to the current time point t, on the basis of the inter-image distances held on said distance table, $j_c$ being a predetermined constant integer in the range of $0 < j_c \leq J$; and
   (c) comparing said scene changing ratio with a predetermined threshold value and, on the basis of the result of said comparison, deciding whether the image of said $j_c$-th preceding frame is a cut point.

2. The method of claim 1, wherein said step (a) includes a step of calculating, as a value corresponding to said inter-image distance d(t–i, t–j), a difference sum obtained by adding absolute values of intensity differences between pixels at corresponding positions (x, y) of images $I_{t-i}$ and $I_{t-j}$ over the entire areas of i-th and j-th frames preceding the current time point t.

3. The method of claim 1, wherein said step (a) includes a step of generating intensity histograms having a predetermined number of classes for images $I_{t-i}$ and $I_{t-j}$ of i-th and j-th frames preceding the current time point t and calculating, as a value corresponding to said inter-image distance d(t–i, t–j), a difference sum obtained by adding absolute values of frequency differences between corresponding classes of said histograms.

4. The method of claim 1, wherein said step (a) includes a step of calculating intensity differences between pixels at corresponding positions (x, y) of images $I_{t-i}$ and $I_{t-j}$ over the entire areas of i-th and j-th frames preceding the current time point t and providing a standard deviation of said intensity differences as a value corresponding to said inter-image distance d(t–i, t–j).

5. The method of claim 1, wherein said step (a) includes a step of: calculating intensity differences between pixels at corresponding positions (x, y) of images $I_{t-i}$ and $I_{t-j}$ over the entire areas of i-th and j-th frames preceding the current time point t; calculating a standard deviation of said intensity differences; counting the number of pixels having absolute values of said intensity differences larger than said standard deviation; and providing said count value as a value corresponding to said inter-image distance d(t–i, t–j).

6. The method of claim 1, wherein said step (a) includes a step of: calculating, as first differences, intensity differences between pixels at corresponding positions (x, y) of the images $I_{t-i}$ and $I_{t-j}$ over the entire areas of i-th and j-th frames preceding the current time point t; calculating, as second differences, intensity differences between pixels at corresponding positions (x, y) of images $I_{t-i-m}$ and $I_{t-j-m}$ over the entire areas of m-th frames preceding the images $I_{t-i}$ and $I_{t-j}$; calculating a standard deviation of said second differences; counting the number of pixels having absolute values of said first differences larger than said standard deviation; and providing said count value as a value corresponding to said inter-image distance d(t–i, t–j).

7. The method of claim 1, wherein said step (a) includes a step of: calculating intensity differences between pixels at corresponding positions (x, y) of images $I_{t-i-k}$ and $I_{t-j-k}$ over the entire areas of (k+i)-th and (k+j)-th frames preceding the current time point t; calculating a standard deviation of said intensity differences repeatedly for k=1, ..., n; calculating a mean value T of the resulting n standard deviations, n being a predetermined integer equal to or greater than 1; calculating intensity differences between pixels at corresponding positions (x, y) of images $I_{t-i}$ and $I_{t-j}$; counting the number of pixels having absolute values of said intensity differences larger than said mean standard deviation T; and providing said count value as a value corresponding to said inter-image distance d(t–i, t–j).

8. The method of claim 1, wherein said step (a) includes a step of: dividing an image $I_{t-i}$ of an i-th frame preceding the current time point t into blocks each composed of p by q pixels; making a check to determine for each of said blocks if said image $I_{t-j}$ has an area matching said block; counting the number of blocks which do not match any area in said image $I_{t-j}$; and providing said count value as a value corresponding to said inter-image distance d(t–i, t–j).

9. The method of claim 1, wherein said step (a) includes a step of shifting distance data at the positions (i, j) in said distance table generated at time point t–1 to positions (i+1, j+1), calculating new distances d(t, t–1), d(t, t–2), ..., d(t, t–J) as said distances at the current time point t, and writing said calculated values into positions (0, 1), (0, 2), ..., (0, J) of said distance table, thereby generating said distance table at the time point t.

10. The method of claim 1, wherein the range over which to obtain said inter-image distance in said step (a) is limited to a range which satisfies j–i$\leq$g, g being a predetermined constant positive integer smaller than J.

11. The method of claim 10, wherein said step (a) includes a step of shifting distance data at the positions (i, j) in said distance table generated at a time point t–1 to positions (i+1, j+1), calculating new distances d(t, t–1), d(t, t–2), ..., d(t, t–g) as said distances at the current time point t, and writing said calculated values into positions (0, 1), (0, 2), ..., (0, g) of said distance table, thereby generating said distance table at the time point t.

12. The method of claim 11, wherein said step (b) includes a step in which, letting a first area be defined on said distance table by $j_c \leq j \leq J$, $0 \leq i < j_c$ and j–i$\leq$g, letting the total sum of distances in said first area be represented by a($j_c$), letting a second area be defined on said distance table by $0 \leq i < j \leq j_c - 1$, j–i$\leq$g, letting the total sum of distances in said second area be represented by b($j_c$), letting a third area be defined on said distance table by $j_c \leq i < j \leq J$, j–i$\leq$g and letting the total sum of distances in said third area be represented by b'($j_c$), said scene changing ratio is calculated as follows:

$$C(t-j_c) = \{a(j_c) - \beta MAX[b(j_c), b'(j_c)]\}/S$$

where β is a predetermined coefficient for making the data numbers in said first area equivalent to the data number in one of said second and third areas corresponding to larger one of b(j$_c$) and b'(j$_c$) and S is the number of data in said first area.

13. The method of claim 11, wherein said step (b) includes a step wherein, letting a first area be defined on said distance table by j$_c$≦j≦J, 0≦i<j$_c$ and j−i≦g, letting the total sum of distance in said area be represented by a(j$_c$), letting a second area be defined on said distance table by 0≦i<j≦j$_c$−1, j−i≦g, letting the total sum of distances in said second area be represented by b(j$_c$), letting a third area be defined on said distance table by j$_c$≦i<j≦J, j−i≦g and letting the total sum of distances in said third area be represented by b'(j$_c$), said scene changing ratio is calculated as follows:

$$C(t-j_c)=\{a(j_c)-\beta[b(j_c)+b'(j_c)]\}/S$$

where β is a predetermined coefficient for making the data number in said first area equivalent to the data number in said second and third areas and S is the number of data in said first area.

14. The method of claim 9, wherein said step (b) includes a step of calculating, as said scene changing ratio, the similarity between a predetermined template of the same size as that of said distance table for the detection of a cut of at least one desired kind and said distance table generated at the time point t.

15. The method of claim 14, wherein said similarity is a cross-correlation coefficient of said distance table and said template.

16. A video cut detection apparatus which detects a cut point from an image data sequence, comprising:
buffer memory means for sequentially buffering image data of at least J+1 temporally successive frames;
inter-image distance calculating means for calculating a distance d(t−i, t−j) between image data of every pair of images I$_{t-i}$ and I$_{t-j}$ in the range of 0≦i<j≦J in a sequence of latest J+1 frames of images I$_t$, I$_{t-1}$, ..., I$_{t-J}$ which have been supplied at the current time point t, where J is a fixed integer equal to or greater than 3 and i and j are variable integers within the range of 0≦i≦j≦J;
distance table means for storing said inter-image distances calculated by said inter-image distance calculating means;
scene changing ratio calculating means for calculating a scene changing ratio C(t−j$_c$) for the range from the J-th preceding frame to the current time point t on the basis of said distance table means, j$_c$ being a predetermined constant integer which satisfies 0<j$_c$≦J; and
decision means for comparing said calculated scene changing ratio with a predetermined threshold value and for deciding whether said frame (t−j$_c$) is a cut point.

17. The apparatus of claim 16, wherein said buffer memory means includes at least first through (J+1)th frame buffers for temporarily holding image data I$_t$, I$_{t-1}$, ..., I$_{t-J}$ of at least J+1 frames ranging from a frame t to the J-th preceding frame; said inter-image distance calculating means includes first through J-th inter-image distance calculating parts which are supplied with image data I$_{t-1}$, I$_{t-2}$, ..., I$_{t-J}$ from said second through (J+1)th frame buffers, respectively, and supplied, in common, with image data I$_t$ from said first frame buffer, and calculate distances d(t, t−1), ..., d(t, t−J) between said image data I$_t$ and said image data I$_{t-1}$, ..., I$_{t-J}$, respectively; and said distance table means includes means for generating a distance table by shifting distance data at positions (i, j) on said table means to positions (i+1, j+1) and writing distance data into positions (0, 1), ..., (0, J) on said table means, respectively.

18. The apparatus of claim 16, wherein said inter-image distance calculating means is means for calculating said inter-image distances in a further limited range which satisfies i−j≦g, g being a predetermined constant positive integer smaller than J.

19. The apparatus of claim 17, wherein said distance table means includes means for generating a distance table by shifting distance data at positions (i, j) in said distance table means generated at a time point t−1 to positions (i+1, j+1) and writing new inter-image distances d(t, t−1), d(t, t−2), ..., d(t, t−g) calculated by said inter-image distance calculating means at the current time point t into positions (0, 1), (0, 2), ..., (0, g) of said distance table means.

20. The apparatus of claim 19, wherein said scene changing ratio calculating means is means whereby, letting a first area be defined on said distance table means by j$_c$≦j≦J, 0≦i<j$_c$ and j−i≦g, letting the total sum of distances in said first area be represented by a(j$_c$), letting a second area be defined on said distance table means by 0≦i<j≦j$_c$−1, j−i≦g, letting the total sum of distances in said second area be represented by b(j$_c$), letting a third area be defined on said distance table means by j$_c$≦i<j≦J, j−i≦g, and letting the total sum of distances in said third area be represented by b'(j$_c$), said scene changing ratio is calculated as follows:

$$C(t-j_c)=\{a(j_c)-\beta MAX[b(j_c), b'(j_c)]\}/S$$

where β is a predetermined coefficient for making the data numbers in said first area equivalent to the data number in one of said second and third areas corresponding to larger one of b(j$_c$) and b'(j$_c$) and S is the number of data in said first area.

21. The apparatus of claim 19, wherein said scene changing ratio calculating means is means whereby, letting a first area be defined on said distance table means by j$_c$≦j≦J, 0≦i<j$_c$ and j−i≦g, letting the total sum of distances in said first area be represented by a(j$_c$), letting a second area be defined on said distance table means by 0≦i<j≦j$_c$−1, j−i≦g, letting the total sum of distances in said second area be represented by b(j$_c$), letting a third area be defined on said distance table means by j$_c$≦i<j≦J, j−i≦g, and letting the total sum of distances in said third area be represented by b'(j$_c$), said scene changing ratio is calculated as follows:

$$C(t-j_c)=\{a(j_c)-\beta[b(j_c)+b'(j_c)]\}/S$$

where β is a predetermined coefficient for making the data number in said first area equivalent to the data number in said second and third areas and S is the number of data in said first area.

22. The apparatus of claim 16, wherein said scene changing ratio calculating means is means which has a predetermined template of the same size as that of said distance table means for the detection of a cut of at least one desired kind, for calculating, as said scene changing ratio, the similarity between said template and said distance table means generated at the time point t.

* * * * *